United States Patent [19]

Lyles et al.

[11] Patent Number: 5,917,822

[45] Date of Patent: Jun. 29, 1999

[54] METHOD FOR PROVIDING INTEGRATED PACKET SERVICES OVER A SHARED-MEDIA NETWORK

[75] Inventors: Joseph Bryan Lyles; Mark E. Laubach, both of Mountain View; Scott M. Quinn, San Francisco, all of Calif.

[73] Assignees: Xerox Corporation, Stamford, Conn.; COM21, Inc., Mountain View; Telesis Technologies Laboratory, San Ramon, both of Calif.

[21] Appl. No.: 08/631,507

[22] Filed: Apr. 12, 1996

Related U.S. Application Data

[60] Provisional application No. 60/006,796, Nov. 15, 1995.

[51] Int. Cl.⁶ ................................................. H04J 3/24
[52] U.S. Cl. ........................... 370/395; 370/431; 348/12; 348/13
[58] Field of Search .................................. 370/389, 342, 370/397, 399, 404, 412, 431, 443, 449, 468, 395; 348/7, 12, 13, 309

[56] References Cited

U.S. PATENT DOCUMENTS

| | | | |
|---|---|---|---|
| 5,425,027 | 6/1995 | Baran | 370/69.1 |
| 5,544,161 | 8/1996 | Bigham et al. | 370/397 |
| 5,559,999 | 9/1996 | Maturi et al. | 348/7 |
| 5,572,517 | 11/1996 | Safadi | 370/431 |
| 5,579,302 | 11/1996 | Banks | 370/397 |
| 5,579,312 | 11/1996 | Ragache | 370/397 |
| 5,586,121 | 12/1996 | Moura et al. | 370/404 |
| 5,613,191 | 3/1997 | Hylton et al. | 370/342 |
| 5,684,791 | 11/1997 | Raychaudhuri et al. | 370/395 |
| 5,699,532 | 12/1997 | Barrett et al. | 395/309 |

OTHER PUBLICATIONS

Demers et al., "Analysis and Simulation of a Fair Queueing Algorithm," Proceedings of ACM SIGCOMM '89, Austin, Texas, pp. 1–12, 1989.
Golestani, "A Self–Clocked Fair Queueing Scheme for Broadband Applications," IEEE INFOCOM '94, pp. 636–646, 1994.
Large, "Creating a Network for Interactivity," IEEE Spectum, pp. 58–63, Apr., 1995.
Laubach, "The UPSTREAMS Protocol for HFC Networks," birthday version of formal proposal submitted to P802.14 for the Nov., 1995 IEEE 802 Plenary Meeting, Oct., 1995.
Laubach, "ATM Over Hybrid Fiber–Coax Networks," Proceedings of the 1995 2nd International Workshop on Community Networking—Intgrated Multimedia to the Home, IEEE Communications Society, Princeton, New Jersey, pp. 27–33, 1995.
Monti, "Broadband Data Services Over Hybrid Fiber–Coax Networks," 5th ATM/B–ISDN Technical Workshop, Gold Coast, Australia, Jun. 1995.
Roberts, "Virtual Spacing for Flexible Traffic Control," International Journal of Communications Systems, vol. 7, pp. 307–318, 1994.
Zhang, "VirtualClock: A New Traffic Control Algorithm for Packet Switching Networks," Proceedings of ACM SIG-COMM '90, Philadelphia, Pennsylvania, pp. 19–29, 1990.
[International Standard], "Traffic Control and Congestion Control in B–ISDN," Recommendation I.371, International Telecommunications Union Telecommunications Standardization Sector, Perth, Australia, 1995.
[International Standard], "B–ISDN User–Network Interface," Recommendation I.413, International Telecommunications Union Telecommunications Standardization Sector, Geneva, 1991, revised at Helsinki, 1993.

*Primary Examiner*—Douglas W. Olms
*Assistant Examiner*—Shick Hom
*Attorney, Agent, or Firm*—Arnold, White & Durkee

[57] ABSTRACT

A method in accordance with the invention allocates bandwidth, fairly and dynamically, in a shared-media packet switched network to accommodate both elastic and inelastic applications. The method, executed by or in a head-end controller, allocates bandwidth transmission slots, converting requests for bandwidth into virtual scheduling times for granting access to the shared media. The method can use a weighted fair queuing algorithm or a virtual clock algorithm to generate a sequence of upstream slot/transmission assignment grants. The method supports multiple quality of service (QoS) classes via mechanisms which give highest priority to the service class with the most stringent QoS requirements.

20 Claims, 6 Drawing Sheets

PSEUDOCODE FOR RESOURCE ALLOCATOR

| Line | Program Details |
|---|---|
| 501 | Variables: |
| 502 | Structure Flow { |
| 503 |     request_count : integer, |
| 504 |     virtual_time : integer |
| 505 | } |
| 506 | Array NAU-Flow [0 .. number_of_service_classes, 0 .. number_of_NAUs] of Flow; |
| 507 | Schedule_List : list of references to the elements of NAU-Flow, |
| 508 |     including methods for maintaining the list sorted first by service_class then |
| 509 |     by NAU-Flow[ service_class, NAU-ID ] . virtual_time |
| 510 | Structure NAU-info { |
| 511 |     ID : integer, |
| 512 |     request : integer |
| 513 | } |
| 514 | Initialize: |
| 515 | NAU-Flow [ * , * ] := 0 |
| 516 | General algorithm: |
| 517 | If NAU-Info.Request != 0 {  /* new non-zero request arrives from a NAU */ |
| 518 |     TMP := NAU-Flow [service_class, NAU-Info.ID].request_count |
| 519 |     NAU-Flow [service_class, NAU-Info.ID].request_count += NAU-Info.request |
| 520 |     /* TMP == 0 implies NAU previously was idle in service_class    */ |
| 521 |     If TMP == 0 { |
| 522 |         NAU-Flow [service_class , NAU-Info.ID].virtual_time = *time_value* |
| 523 |         /*  The *time_value* is calculated using weighted fair queuing    */ |
| 524 |         Enqueue pointer to NAU-Flow[ service_class, NAU-Info.ID] in Schedule_List |
| 525 |     } |
| 526 | } |

FIG. 5

PSEUDOCODE FOR SCHEDULER

| Line | Program Description |
|---|---|

601 Initialization:

602    /* Assume Schedule_List from Table 1 is available to this algorithm */

603 General algorithm:

604    /* Select entry with highest priority service class and lowest virtual time from the 605        schedule list. Recall that Schedule_List contains references to elements 606        of NAU-Flow */

607    TMP := highest priority entry of Schedule_List

608    /* Generate grant and adjust (decrement) residual NAU-Flow.request_count 609        appropriately for the allocation*/

610    Generate_Grant ( TMP )

611    Decrement( TMP )

612 If TMP.request_count != 0 {    /* indicates residual bandwidth needs */

613    TMP.virtual_time = *time value*

614    /* The *time_value* is calculated using weighted fair queuing */

615 }

FIG. 6

METHOD FOR PROVIDING INTEGRATED PACKET SERVICES OVER A SHARED-MEDIA NETWORK

Pursuant to 35 U.S.C. §119(e), this application claims the priority of the inventors' provisional application filed on Nov. 15, 1995, Ser. No. 60/006,796, which is incorporated herein by reference.

1. BACKGROUND OF THE INVENTION

The invention relates in general to the field of computer network communications and, more particularly, to a method for fairly allocating transmission bandwidth in a shared-media packet-switched network.

1.1. Introduction

Figure 1:
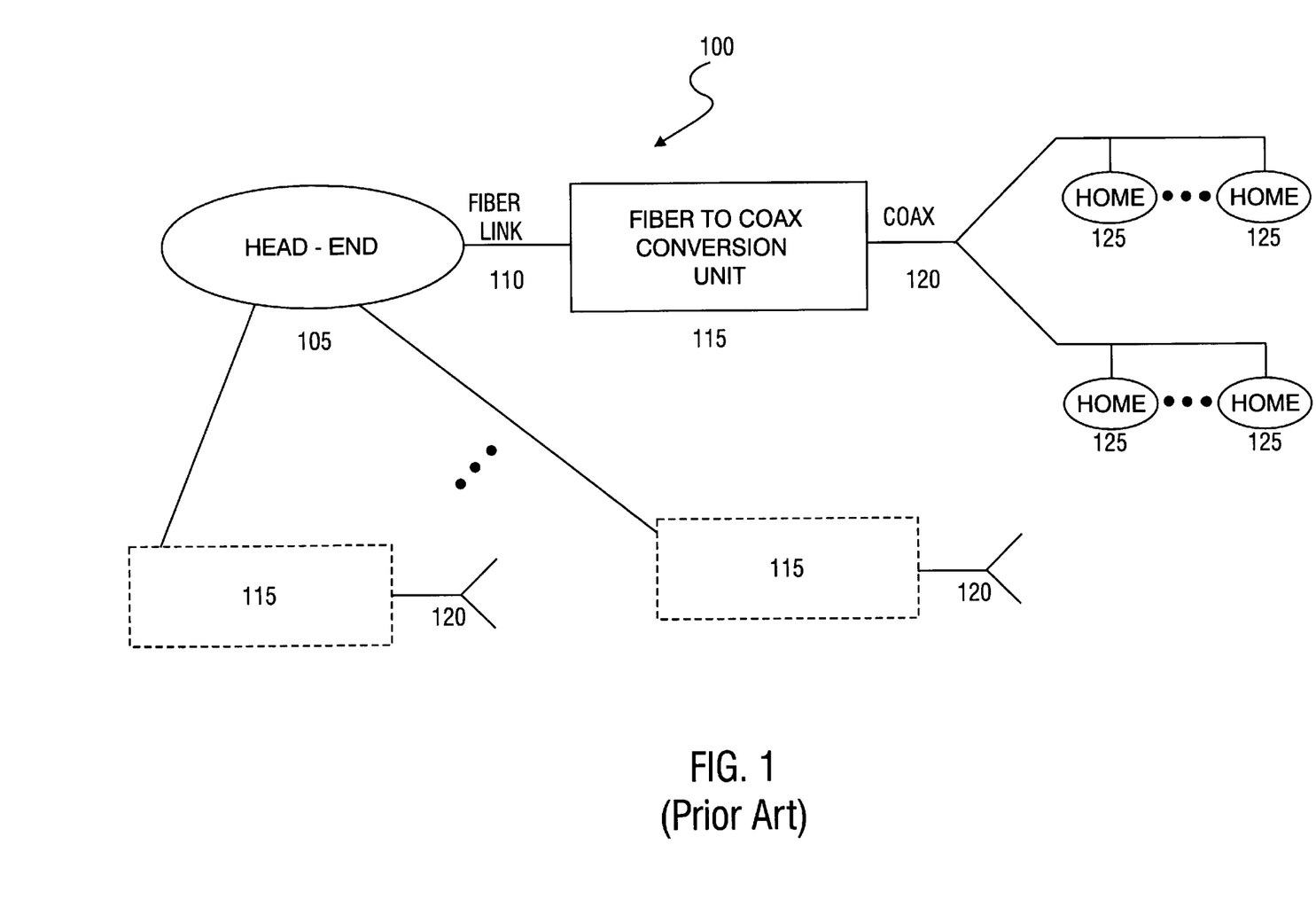
FIG. 1 is a block diagram of a hybrid fiber-coax cable television communications network.

As originally designed and implemented, cable television (CATV) systems used only coaxial cable between a head-end controller, or distribution station, and the customer. Newer cable systems tend to be hybrids of fiber optics and coaxial cable; optic fiber being used for long distance distribution and coax being used for the last few thousand feet into individual customer sites. FIG. 1 shows a hybrid fiber-coax (HFC) system 100 comprising a head-end controller 105 connected via one or more fiber optic links 110 to a fiber-to-coax conversion unit 115 which, in turn, feeds a coaxial cable distribution network 120 running into a number of individual user or customer sites (e.g., homes 125). Cable television systems with this general type of hardware layout are fairly typical in the art today.

Cable systems originally provided uni-directional transfer of programming from the head-end controller 105 to the customer 125. With the growth of computer networks and a desire to provide real-time interactive services to the customer, the need for an efficient means to provide two-way communication over an existing HFC network type network exists. A number of service providers currently furnish two-way services over cable. In these services there is generally a modestly high bandwidth link from the head-end controller to the user site. However, the link in the other direction, from the user's site to the network, is through conventional dial-up facilities such as a modem or an integrated services and data network (ISDN) connection, which commonly have a much lower bandwidth than the head-end-to-user-site link. Such systems allow the customer to quickly download material from the network into their local machine (e.g., a personal computer or, more generally, a terminal equipment), but does not readily permit the user to originate any significant transmissions.

Figure 2:
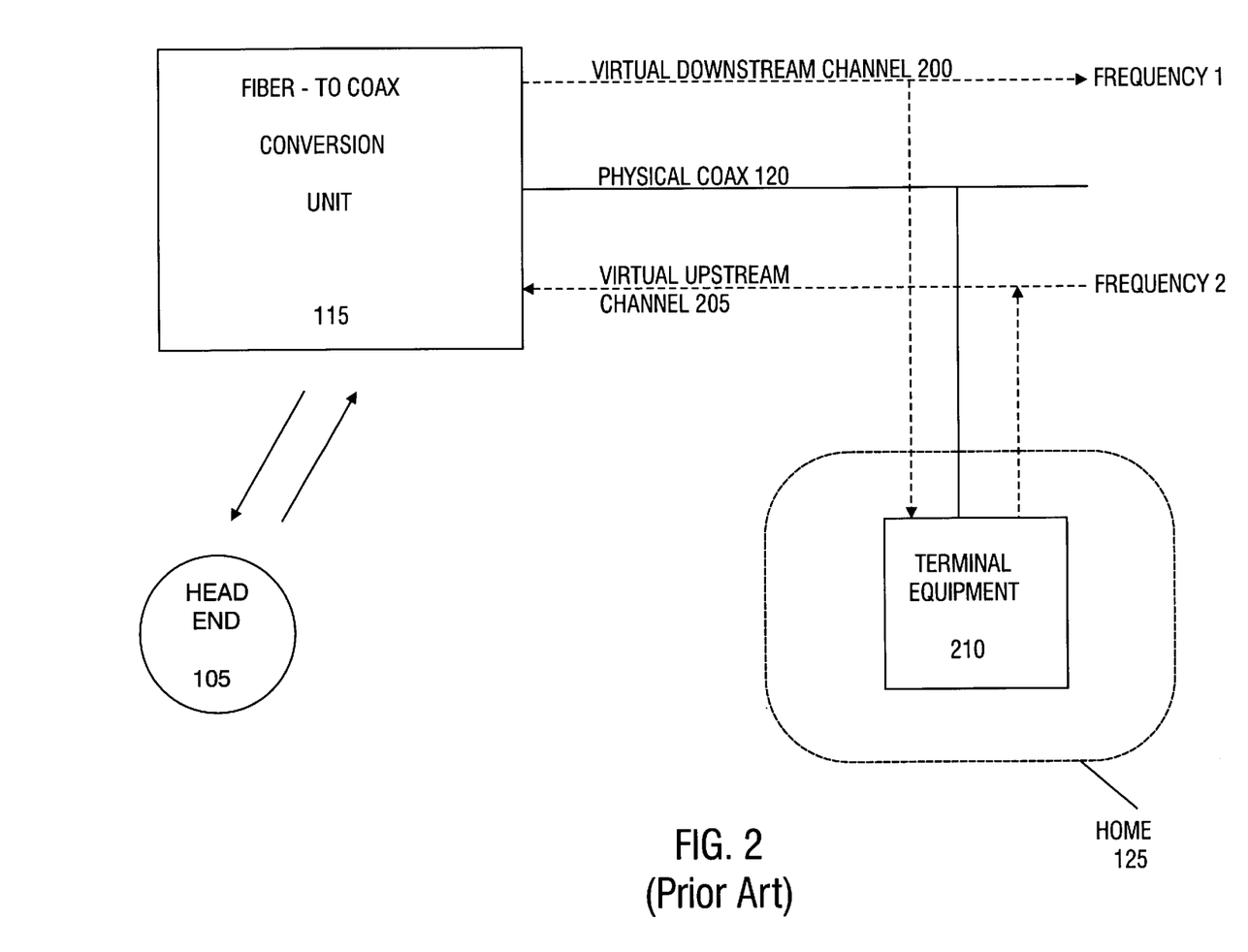
FIG. 2 is a block diagram of virtual upstream and downstream communication channels in a shared-media network.

One way of enabling customers to originate significant transmissions is to permit them to use the cable system, which has a comparatively high bandwidth, for such transmissions. Within existing HFC networks, providing customers with the ability to transmit data upstream requires service providers (those organizations that operate head-end stations) to reserve sections of cable spectrum, i.e., bandwidth, for data services, and also to provide a mechanism for allocating that bandwidth to upstream users. As shown in FIG. 2, reserved bandwidth can be used to create virtual downstream 200 and upstream 205 channels. In this manner downstream and upstream data is (frequency) multiplexed over a single physical transmission cable 120 between one or more customer sites (via terminal equipment 210 such as a cable modem or a television set-top box) and a head-end controller 105 via a fiber-to-coax conversion unit 115.

Figure 3:
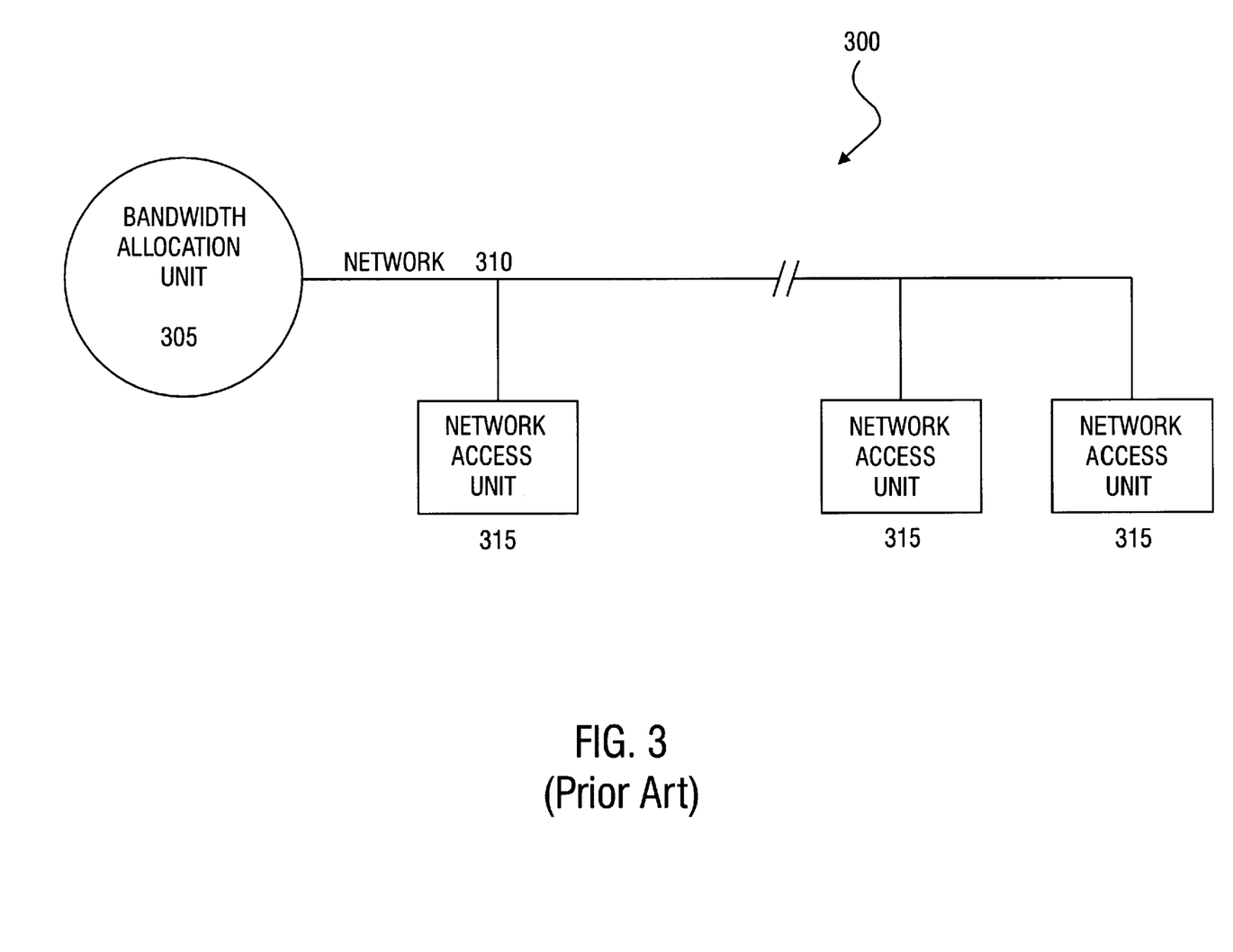
FIG. 3 is a block diagram of a generic communications network.

FIG. 3 is a block diagram of a generic computer communication network 300 comprising a bandwidth allocation unit (BAU) 305, a physical communications network 310, and a plurality of network access units (NAUs) 315. Like a head-end controller 105, a bandwidth allocation unit is responsible for allocating downstream bandwidth (i.e., transmission from or through a bandwidth allocation unit 305 toward a network access unit 315 or customer/user site) and upstream bandwidth (i.e., transmission from a network access unit 315 or customer/user site toward a bandwidth allocation unit 305) over the network 310. In particular, a bandwidth allocation unit 305 is responsible for processing requests for transmission bandwidth from network access units 315 (such as, for example, a user's terminal equipment 210). A network access unit 315 can be, for example, a terminal equipment 210 such as a personal computer located at a customer's site.

1.2. Some Useful Definitions

The following alphabetical list of definitions and accompanying discussion, regarding various aspects of network characteristics and bandwidth allocation, are provided for the benefit of the reader.

ATM. Asynchronous Transfer Mode, which generally refers to a very specific telecommunications "protocol," discussed at the end of Section 1.3.

Authorization. Permission issued by a bandwidth allocation unit (BAU) to either a single network access unit (NAU) or a group of network access units that grants or permits use of the network access unit to bandwidth allocation unit (i.e., upstream) transmission resource during a specific time period. The case of the bandwidth allocation unit issuing permission to a single network access unit is called a "directed grant," when permission is issued to multiple network access units it is called a "contention grant." Authorizations are "use it or lose it." See also the discussion of Grant, below.

Bandwidth Allocation Unit (BAU). The collection of those bandwidth allocation functions co-located within a head-end controller responsible for the scheduling and allocation of transmission resources for both the downstream and the upstream channels of the shared media.

Class of Service. Even though the quality of service (QoS, see below) requirements of users may vary over a continuous spectrum of values, a network can only handle a restricted set of QoS classes corresponding to specific objective values of the relevant network performance parameters.

The ITU (International Telecommunications Union) specifies the following QoS classes in Recommendation I.371.

1. Deterministic Bit Rate (DBR): Traffic conformance is based on peak cell rates (PCR) and is characterized by low cell delay variation (CDV) and low cell loss ratio (CLR).
2. Statistical Bit Rate (SBR): Traffic conformance is based on a sustainable cell rate (SCR), a burst size and a PCR and is characterized by a medium to large CDV and low CLR.
3. Available Bit Rate (ABR): Traffic conformance is based on dynamic feedback of the actual capacity available within the network. Sources may always send at a signaled/negotiated minimum cell rate (MCR) and must never send at more than the PCR. This service type is characterized by large CDV, variable CTD, and low CLR.

The ATM Forum has adopted the ITU's classes and has further added the following service classes.

1. Deterministic bit rate is designated as constant bit rate (CBR).
2. Statistical bit rate is designated as variable bit rate (VBR).
3. Real-Time Variable Bit Rate (rt-VBR): Traffic conformance is based on a sustainable rate, a burst size and a peak rate. This service is characterized by a low CDV and low CLR.

4. Unspecified Bit Rate (UBR): Traffic conformance is based on the peak cell rate and can have potentially very large CDV and CLR.

The IETF (Internet Engineering Task Force) has defined the following service classes.

1. Real-Time: Traffic conformance is based on a token bucket with a sustainable rate, and a bucket size; peak rate is assumed to be the line rate. Real-time services are characterized by low packet delay variation and very low packet loss.
2. Predictive: Traffic conformance is based on a token bucket with a sustainable rate and a bucket size; peak rate is assumed to be the line rate. Predictive services' are characterized by medium packet delay variation and low (but larger than that of real-time) packet loss.
3. Best Effort: No traffic conformance. Characterized by large packet delay variation and a potentially large packet loss.

FIFO. First-In, First-Out, a method of managing a queue of items, referred to at the end of Section 1.3.

Flow. For the purposes of this document, a flow is a set of packets traversing a network or subnetwork all of which are covered by the same request for control of quality of service. At a given network element a flow may consist of the packets from a single application session, or it may be an aggregation comprising the combined data traffic from a number of application sessions.

Flow Identifier. A flow identifier uniquely identifies a packet as belonging to a flow. Examples of flow identifiers are ATI VCs, IPv6 flow identifiers, IPv4 from:<IP address, protocol, port>, to:<IP address, protocol, port>pairs, or a <NAU id, QoS class>pair. In the case of a <NAU id, QoS class>pair being used as a flow identifier, the network access unit may be multiplexing multiple application-level flows onto the flow identifier used by a bandwidth allocation unit-network access unit pair. For the purpose of this document it is the knowledge of the flow identifier by a bandwidth allocation unit for a flow that is relevant.

Grant. A transmission from the bandwidth allocation unit (BAU) 305 to network access units (NAUs) 315 specifying one or more time/space slots in which particular network access units can transmit. All active network access units 315 scheduled by a bandwidth allocation unit are required to receive and process the grants from that bandwidth allocation unit 305. See also the discussion of Authorization, above.

Head-end controller. See Section 4.2, note [3].

HFC. Hybrid fiber-coax, a type of communications network including both fiber-optic cable and coaxial cable, discussed at the beginning of Section 4.1.

Multiplexing. Multiplexing can be viewed as a layer function which maps some number of upper layer tributary associations onto a single lower layer aggregate association. In terms of the ISO layer model, a multiplexing point is an N-layer function which aggregates one or more N+1 layer tributaries onto an N-layer tributary.

Network Access Unit (NAU). The collection of those bandwidth access functions necessary to (1) (possibly) aggregate traffic; (2) make requests of the bandwidth allocation unit 305; and (3) receive authorizations and transmit based on those authorizations.

Network Element. Any component of an internetwork which directly handles data packets and thus is potentially capable of exercising quality of service control over data flowing through it. Network elements include ATM switches, packet switches, routers, subnetworks, and end-node operating systems.

Protocol. In this context, a protocol is a method of transmitting information in which specific information is transmitted in a specific sequence and/or at specific times. A very simple example of a protocol is the 1-plus method of dialing a long-distance phone call, in which a 1 at the beginning of a dialed phone number indicates that a long-distance call is being made; the next three digits in the phone number indicate the area code to which the call is being made; and the last four digits indicate the local phone number being called.

Quality of Service (QoS). Quality of service requirements are specified in terms of objective values of network performance. These network performance parameters may include, for example, packet loss ratios, transfer delays, and delay variations. For ATM networks performance parameters are specified in Recommendation I.356 and include cell loss ratio (CLR), cell transfer delay (CTD), and cell delay variation (CDV).

Traditionally, the Internet has offered a single QoS; best-effort delivery with available bandwidth and delay characteristics dependent on instantaneous load. Control over the QoS seen by applications is exercised by adequate provisioning of the network infrastructure. In contrast, a network with dynamically controllable QoS allows individual application sessions to request network packet delivery characteristics according to their perceived needs, and may provide different qualities of service to different applications. It will be understood by one of ordinary skill in the art of computer network design and administration that there is a range of useful possibilities between the two endpoints of providing no dynamic QoS control at all and providing extremely precise and accurate control of QoS parameters.

Request. A network access unit (NAU) to bandwidth allocation unit (BAU) message which requests transmission resources in the direction from the network access unit 315 to the bandwidth allocation unit 305 (i.e., the "upstream" direction). Requests for transmission resources at an N-layer entity can be generated explicitly from an N+1-layer request or implicitly by the arrival of N+1-layer traffic at the N-layer entity.

Shared Media. Any media such that (1) the bandwidth allocation unit 305 schedules the entirety of the transmissions, and can transmit to any single network access unit 315, or group of network access units 315, or to the entire plurality of network access units 315 linked to that bandwidth allocation unit 305, and (2) the bandwidth allocation unit 305 explicitly authorizes any single network access unit 315, or group of network access units 315, access to the media for transmission from the network access unit 315 to the bandwidth allocation unit 305.

Terminal equipment. See Section 4.2, note [3].

Virtual scheduling time. A value used in assigning priority to transmission requests, discussed in Section 4.2, notes [5] and [9], and in Section 4.3.

Weighted fair queuing. A method of allocating resources, discussed in Section 1.4.

1.3. Network Communication Protocols

Because of network topology, cable length, and electrical factors, transmission techniques such as the Ethernet's carrier-sense multiple access with collision detection (CSMA-CD) do not work well in a hybrid fiber-coax (HFC) environment Other bandwidth sharing schemes such as the IEEE 802.6 Distributed Queued Dual Bus (DQDB) standard or the ANSI X3.139-1987/ANSI X3.148-1988 Fiber Distributed Data Interface (FDDI) standard require point-to-point links between each consecutive pair of user or terminal equipment sites. This requirement results in less than optimal use of radio frequency (RF) spectrum or bandwidth on the physical cable, making it very difficult to provide for the numbers of end systems (e.g., users or terminal equipment sites) which must be served on a single cable segment 120. Such ring architectures are also not ideal for public services since they depend on every node in the network (or sub-network) being operational and functioning correctly.

One scheme known to work on a cable system is to assign transmission resources on a fixed increment basis, allowing each terminal equipment 210 (or other network access unit 315) to transmit only within its allocation, such as is seen in a fixed time domain multiplexed access (TDMA) method where terminals are assigned fixed slots in which to transmit. The same can be seen in a frequency domain multiple access (FDMA) method where terminals are assigned frequencies on an exclusive-use basis. For fixed bandwidth applications, these methods are often quite efficient. However, for non-fixed bandwidth applications, such as Internet traffic or variable-rate video traffic, the use of TDMA or FDMA methods can be wasteful of bandwidth. That is, the TDMA and FDMA methods may divide available bandwidth inefficiently when a terminal equipment's bandwidth requirements vary in time.

Many applications (i.e., processes executing at a terminal equipment 210 or other network access unit 315) can operate with whatever bandwidth they are given and can usefully utilize as much bandwidth as they can get. These applications are said to have elastic bandwidth requirements; most applications currently running on LANs (local area networks) have elastic bandwidth requirements. Service classes which support elastic applications are known as "best effort" in the Internet community and available bit rate (ABR) in the Broadband ISDN/ATM community. Another set of service classes support real-time applications such as circuit emulation and video. Real-time applications may require data be transmitted through the network with bounded jitter (e.g., packet delay variation). These applications are said to have inelastic or real-time bandwidth requirements. For a general discussion of these topics, see Shenker, "Fundamental Design Issues for the Future Internet," IEEE Journal on Selected Areas in Communications (JSAC), Vol. 13, No. 7, September, 1995, pp. 1176–1188.

Asynchronous Transfer Mode (ATM) switching is becoming an accepted mechanism for providing sufficient peak and aggregate bandwidths to support the aforementioned applications as well as supporting multiple service classes. Many ATM switches are currently implemented with first-in first-out (FIFO) queuing which is known to exhibit pathological behavior when used for ABR traffic. For a discussion of the same issues in the Internet context, see Floyd and Jacobson, "On Traffic Phase Effects in Packet-Switched Gateways," Internetworking: Research and Experience, Vol. 3, pp. 115–156 (1992); and Zhang et al., "Observations on the Dynamics of a Congestion Control Algorithm: The Effects of Two-Way Traffic," ACM SIGCOMM 91 Conference, Sep. 3–6, 1991, Zurich, Switzerland, pp. 133–148. Further, because FIFO queuing does not provide isolation, it is unable to protect correctly behaving applications against misbehaving applications.

1.4. Weighted Fair Queuing

Weighted fair queuing can be used to provide bounded jitter (packet delay variation) for real-time packet communications. See Parekh, "A Generalized Processor Sharing Approach to Flow Control in Integrated Service Networks," Ph.D. thesis, Department of Electrical Engineering and Computer Science, MIT (1992). Recent results have also established delay bounds for systems using the closely related mechanisms of virtual clock and self-clocked fair queuing. See Goyal et al., "Determining End-to-End Delay Bounds in Heterogeneous Networks," in Proceedings of the 5th International Workshop on Network and Operating System Support for Digital Audio and Video (NOSSDAV), Durham, N.H., Apr. 18–22, 1995.

Weighted fair queuing is also known to provide excellent service for ABR or "best effort" services classes. Some of the original work on fair queuing was motivated by a desire to avoid the pathologies of FIFO-based queuing. See Christopher Lefelhocz, Bryan Lyles, Scott Shenker, Lixia Zhang, "Congestion Control for Best Effort Service: why we need a new paradigm," IEEE Network Magazine, January 1996, for a general discussion of mechanisms for the elastic service classes.

As a result, non-FIFO queuing mechanisms such as weighted fair queuing and approximations to fair queuing such as round-robin have been suggested as a means of allocating bandwidth in conventional packet-switched networks. See, for example, Demers et al., "Analysis and Simulation of a Fair Queuing Algorithm," in Proceedings of ACM SIGCOMM, pp. 1–12, (1989); and Hahne, "Round-Robin Scheduling for Max-Min Fairness in Data Networks," IEEE Journal on Selected Areas in Communications, Vol. 9, pp. 1024–1039 (1991).

In conventional packet-switched networks, data packets arrive at a switch (e.g., the head-end controller or, more generally, a bandwidth allocation unit) before bandwidth for its subsequent transmission to a destination terminal equipment (or, more generally, a network access unit) has been allocated. In these systems, therefore, there is no logical separation between a data packet and a request for transmission. Shared-media networks, in contradistinction, logically, physically, and temporally separate a data packet's request for transmission and its actual transmission.

Thus, a need to allocate bandwidth, fairly, and dynamically, in a shared-media packet switched network such as conventional hybrid fiber-coax television networks exists. Such bandwidth allocation should accommodate both elastic and inelastic applications.

2. SUMMARY OF THE INVENTION

The invention relates to a method to allocate bandwidth, fairly and dynamically, in a shared-media packet switched network, which accommodates both elastic and inelastic applications. The method is directed at allocating bandwidth transmission slots between a terminal equipment 210 (or more generally a network access unit 315) and a head-end controller 105 (or more generally a bandwidth allocation unit 305) in a shared-media network (e.g., the network 300). Specifically, the inventive method manipulates requests for transmission bandwidth received by a bandwidth allocation unit from a network access unit, converting the arriving requests into virtual scheduling times for granting access to the shared media. Further, the inventive scheme supports multiple quality of service (QoS) classes via mechanisms which give highest priority to the service class with the most stringent QoS requirements.

If a bandwidth allocation unit 305 associates a time-stamp with a request for bandwidth from a network access unit 315, either a weighted fair queuing algorithm or a virtual clock algorithm may be used to generate a sequence of upstream slot/transmission assignment grants which the bandwidth allocation unit 305 can transmit downstream to the requesting network access unit 315. Time stamps can be derived from requests for bandwidth and thereafter used to generate transmission time-slots in which the actual packets can be transmitted. Use of weighted fair queuing or virtual clock algorithms allow tight jitter bounds to be placed on a network's inelastic service, while use of weighted fair queuing is known to provide excellent service for elastic applications.

This idea can be extended to include requests from a network access unit 315 consisting of a batch of transmission requests; one request for each packet to be transmitted. Further, requests can be made either in terms of a rate (e.g., "please give me 100 packets-per-second"), or in terms of a burst (e.g., "I have 20 packets queued up ready to send").

In addition, a request may contain a single information element which represents an aggregation of individual queued transmission requests (e.g., a single summary request representing the request status of the collection of transmission queues at the network access unit); or a request may contain multiple information elements, a batch, which represents a burst size worth of requests over one or more transmission queues at the network access unit. The implementation for either scheme in the bandwidth allocation unit can use a simple counter per network access unit which is incremented when a request is received by the bandwidth allocation unit and decremented when an authorization grant is issued by the bandwidth allocation unit.

Moreover, for guaranteed rate-based service, a proxy request generator at the bandwidth allocation unit may be used which issues a virtual service request on behalf of the network access unit for the specified rate of the service.

4. DETAILED DESCRIPTION OF SPECIFIC EMBODIMENT

For purposes of illustration, a specific embodiment is described below. Bracketed numbers refer to the notes following the description of the embodiment.

In the interest of clarity, not all features of actual implementations are described in this specification. It will of course be appreciated that in the development of any such actual implementation, as in any such project, numerous engineering and programming decisions must be made to achieve the developers' specific goals and subgoals (e.g., compliance with system- and business-related constraints), which will vary from one implementation to another. Moreover, attention will necessarily be paid to proper engineering and programming practices for the environment in question. It will be appreciated that such a development effort might be complex and time-consuming, but would nevertheless be a routine undertaking for those of ordinary skill in the field of data communications system design having the benefit of this disclosure.

4.1. Illustrative Method of Selective Authorizing Transmission

Figure 5:
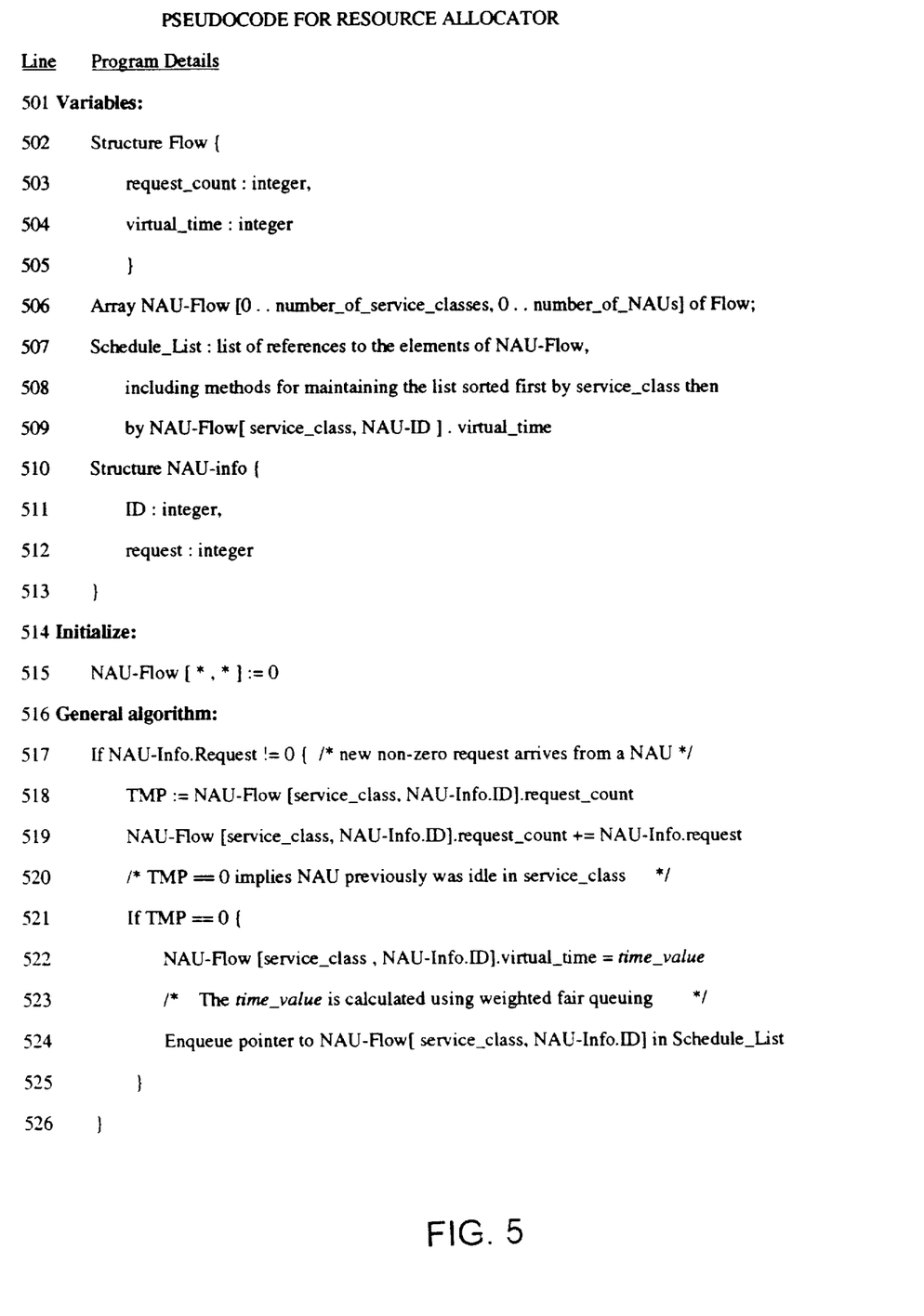
FIGS. 5 and 6 are pseudocode program listings.
Figure 6:
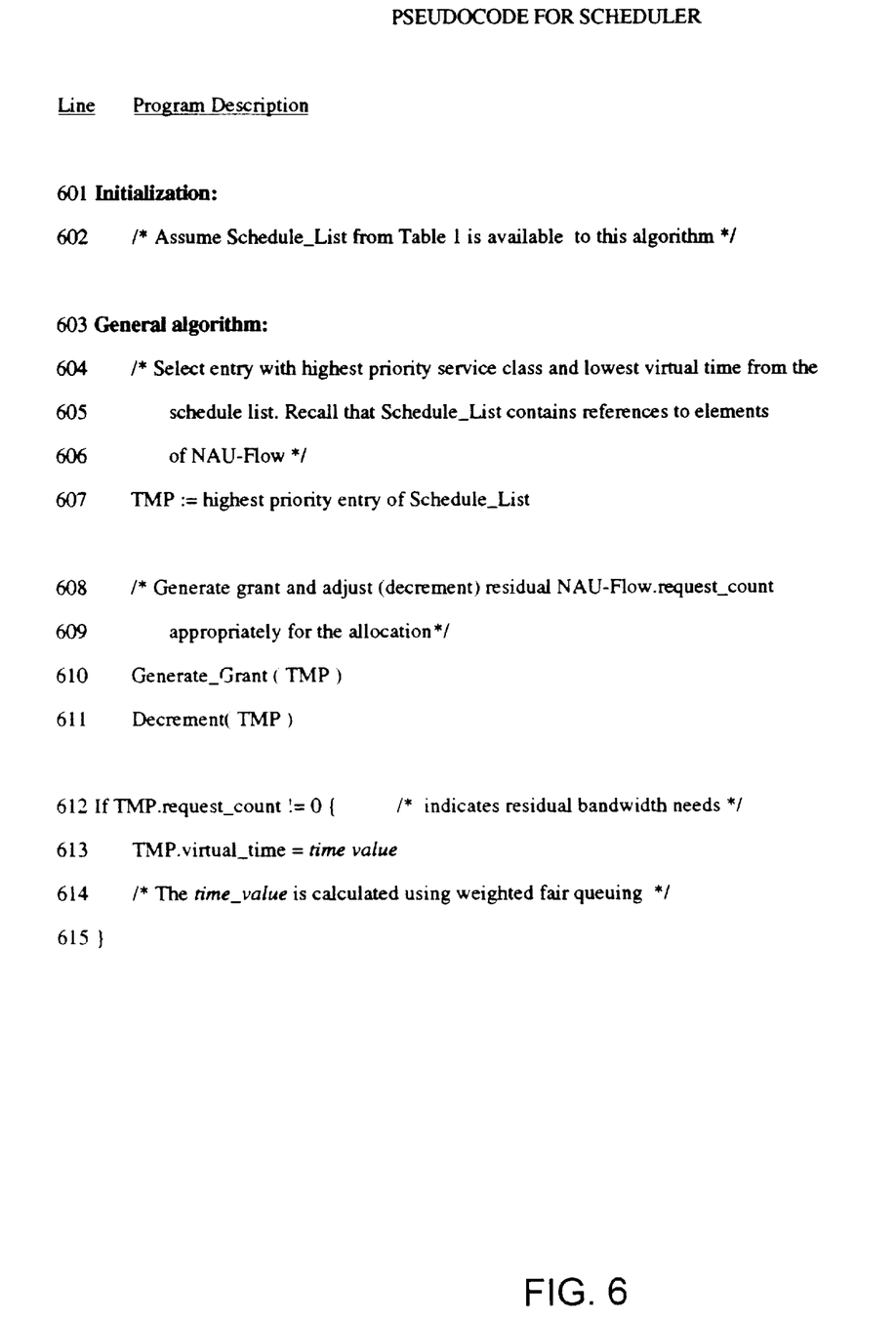

This illustrative embodiment includes a method for selectively authorizing transmission of packet-based communications signals [1] in a hybrid fiber-coax (HFC) network [2] such as the network 100 or more generally a network 300. The HFC network has a head-end controller 105 (or more generally a bandwidth allocation unit 305) and a plurality of terminal equipment units 210 [3] (or more generally a plurality of network access units 315) that are linked, i.e., operatively coupled, to and managed by a single head-end controller 105. FIGS. 5 and 6 contain pseudocode programs which further illustrate the method described. Each bandwidth allocation unit 305 has associated with it variables such as those shown in Lines 501 through 509 of FIG. 5. Additionally, it has variables such as those shown in Lines 510 through 513 which indicate data conveyed by a request from a NAU to the BAU. At system initialization time, an initialization function such as described in Lines 514 through 515 of Table 1 should be executed.

Figure 4:
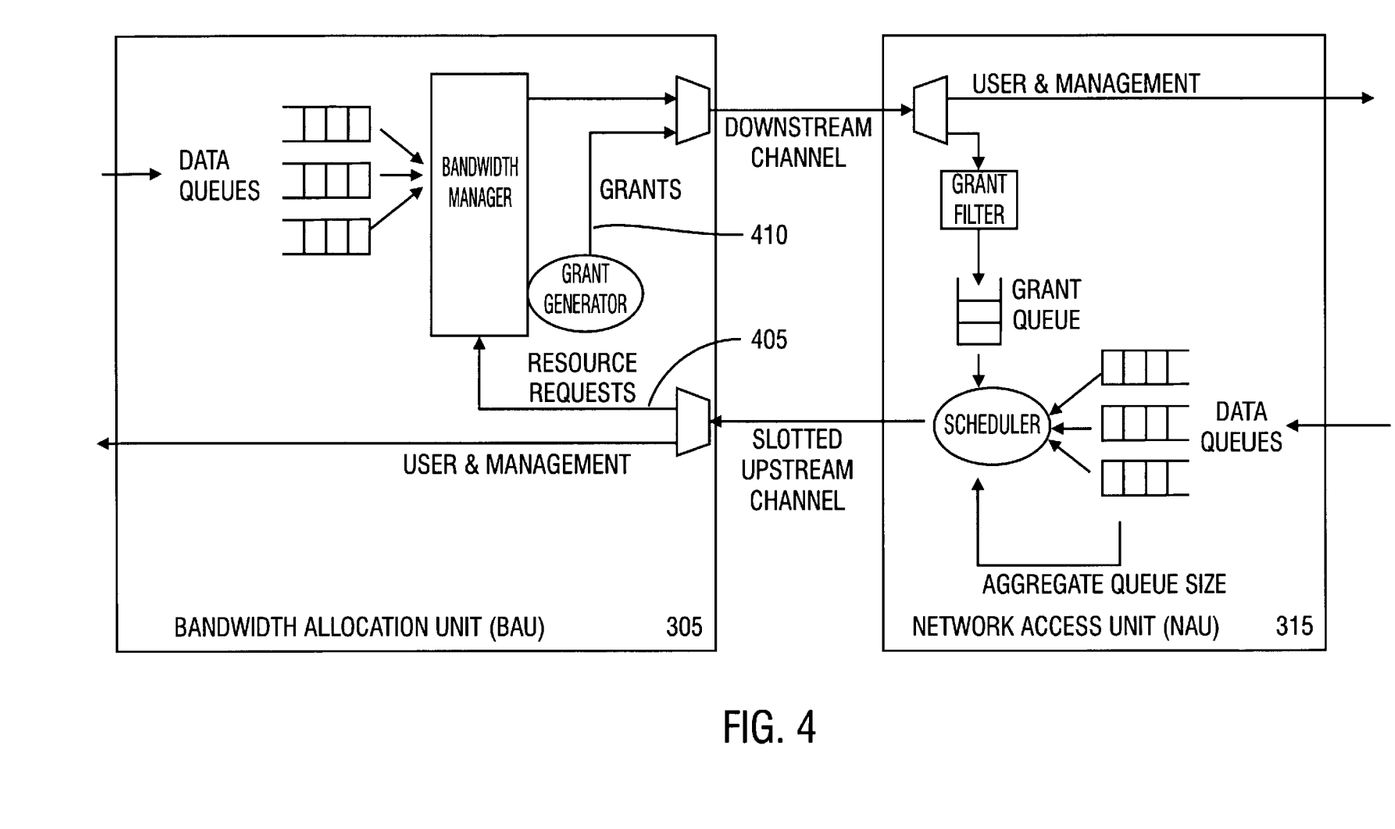
FIG. 4 is a high-level block diagram of the information flows between the bandwidth allocation unit and a single network access unit.

Referring to the data flow diagram in FIG. 4, the method, executed by the head-end controller 105 (or other bandwidth allocation unit 305), comprises:

(a) receiving a transmission authorization request 405 [4] from an identified terminal equipment 210 as illustrated in Lines 517 through 519 of Table 1 the transmission authorization request 405 being associated with a requested transmission;

(b) generating a virtual scheduling time [5] for the requested transmission, based on (1) the time of arrival of the transmission authorization request 405 [6], (2) a class of service associated with the transmission authorization request 405 [7], and (3) a virtual scheduling time of a previous transmission authorization request 405 made on behalf of the identified terminal equipment 210 [8]. Lines 520 through 523 of FIG. 5 illustrate an implementation of this scheduling activity based on weighted fair queuing;

(c) adding to a transmission scheduling list an entry corresponding to the transmission authorization request 405 [9] as illustrated by Line 524 of Table 1.;

(d) sorting the transmission scheduling list in accordance with a lexicographic sort [10] as illustrated by Line 508 and 509 of FIG. 5; and (e) sending a transmission authorization signal 410 [11] to the identified terminal equipment 210 in accordance with the position of the virtual scheduling time in the transmission scheduling list. Lines 603 through 615 of FIG. 6 illustrate this using weighted fair queuing and also illustrate that, in the case of where more than one request was queued, an additional grant is scheduled without the arrival of an explicit request.

4.2. Notes to Illustrative Method Description

[1] The term "packet-based communications signals" includes Internet protocol-based communications, asynchronous transfer mode (ATM) communications, datagram services, frame relay, and similar services. Further, the illustrative embodiment is applicable to either fixed or variable sized packets and either connection or connectionless orientated network protocols.

[2] The term "hybrid fiber-coax (HFC) network" means a network comprising a combination of optic fiber links and coaxial fiber links, e.g., the network 100 shown in FIG. 1 (see also FIG. 2). One aspect of a HFC network important to the present description is its characterization as a shared-media access network. A shared-media access network is one in which a plurality of stations transmit communications signals over one or more common channels (e.g., a cable or a collection of radio frequencies); where all of a specified collection of stations (e.g., a plurality of user sites or network access units as shown in FIGS. 1, 2, and 3) share the channel's available bandwidth.

Additional information on one embodiment of a HFC network, one specifically aimed at the cable television (CATV) market, is described in "The UPSTREAMS Protocol for HFC Networks" proposal submitted to the IEEE (Institute of Electrical and Electronics Engineers) 802.14 Cable TV Protocol Working Group and made part of the above-referenced provisional U.S. application. The 802.14 proposal describes one possible means of providing integrated services, such as data, voice, and video for a large geographic area over a CATV network. It is noted, however, that the invention is not limited to a HFC/CATV network, but rather is applicable to any shared-media packet switched network. For example, the physical network (e.g., element 310 in FIG. 3) may include, but is not limited to, the use baseband or radio frequency transmission over a physical (e.g., copper or coaxial) cable or the use of radio-frequency or infrared transmissions over the airwaves.

[3] A head-end controller 105 in accordance with the invention is a control unit which resides at, for example, a CATV distribution hub, incorporates the bandwidth allocation unit functions, and is responsible for managing all resources supplied to it and, in particular, the allocation of downstream and upstream message bandwidth. The head-end controller 105 may comprise one or more physical devices and/or may be implemented as one or more programs executed by one or more programmable processors within one or more of such devices (not shown). The processors may be general-purpose processors, or alternatively may be specialized processors such as application-specific integrated circuits (ASICs), as a matter of routine selection by those of ordinary skill having the benefit of this disclosure.

The term "terminal equipment" 210 refers to a unit at a user or customer site and is intended to encompass well-known telecommunications devices such as, e.g., terminal adapters, and network termination devices. In particular, a terminal equipment 210 may comprise multiple physical devices that collectively perform the network allocation unit functions. A terminal equipment 210 may also be implemented as one or more programs executed by one or more programmable processors (as described in the previous paragraph; not shown) within one or more of the physical devices.

In a network operated in accordance with the IEEE 802.14 proposal, for example, the sharing discipline on a downstream radio frequency (RF) channel is a one-to-many method, where the head-end controller 105 broadcasts to all stations (e.g., terminal equipment units 210) on a common RF channel. Messages from the head-end controller 105 may either be unicast, multicast, or broadcast. The sharing discipline on the upstream RF channel is, on the other hand, a many-to-one method in that many terminal equipment units 210 share the same upstream RF channel. Upstream messages are always unicast and sent from the terminal equipment 210 to the head-end controller 105. To transmit, a terminal equipment 210 must have permission from the head-end controller 105 to use a portion of the common upstream RIF channel bandwidth.

[4] In an 802.14 type network, access to an upstream channel (e.g., from a terminal equipment 210 to the head-end controller 105) will either be granted on a specific station basis (directed grant), on a contention basis (request grant), or for station registration purposes (acquisition grant). The specific type of grant 410 and when these are scheduled are managed directly by the head-end controller 105. These grants 410 are transmitted as messages in the downstream channel to the appropriate station(s). In addition to explicit requests 405 for bandwidth from a terminal equipment 210, the inventive method can accommodate implicit requests generated automatically at the head-end controller in accordance with previous negotiation between the head-end controller 105 and terminal equipment 210.

[5] The "virtual scheduling time" of a transmission is a time value used for ordering or ranking a grant 410 of authorization for the transmission with respect to other such grants 410. Virtual time is well-known to those of ordinary skill and thus will not be further described here. For further information on the general concept of virtual scheduling time, see e.g.,A. Demers, S. Keshav, and S. Shenker, "Analysis and Simulation of a Fair Queuing Algorithm," in Proceedings of ACM SigComm 1989, pp. 1–12; or L. Zhang, "Virtual Clock: A New Traffic Control Algorithm for Packet Switching Networks," in Proceedings of ACM SigComm 1990, pp. 19–29; or chapter 8 of L. Peterson and B. Davie, "A Systems Approach to Computer Networks," Morgan Kaufman Publishers, ISBN 1-55860-368-9, 1996.

[6] The time of arrival of the request 405 as received by the head-end controller 105 may be measured by a conventional clock, e.g., by a hardware clocking mechanism.

[7] The term "class of service" refers to a group of data flows that receive similar treatment with respect to allocation of loss and delay. (See the definitions in the Background section.) The class of service factor may be used to select an algorithm for generating the virtual scheduling time, e.g., weighted fair queuing or round-robin.

In some implementations, only a single class of service may exist. For example, legacy systems such as past implementations of the Internet may have had a single class of service without ever referring to the class of service as such; modern terminology and the emergence of multiple class-of-service networks, however, are retroactively labeling such networks as having a single class of service.

[8] The previous request 405 can be either an explicit request or an implicit request as previously discussed. The previous request is made on behalf of the terminal equipment 210, which often (but not always) means that it was made by the terminal equipment 210 itself. If no previous request exists, then the terminal equipment 210 can transmit a request either 1) in response to a direct poll by the head-end controller 105 (or other bandwidth allocation unit 305), or 2) via a contention mechanism.

[9] At its most basic, an entry in the transmission scheduling list may take the form of a virtual scheduling time plus an identifier of the terminal equipment 210 that made the request. The position of each entry in the transmission scheduling list may indicate the current view of the time at which the terminal equipment 210 associated with that entry will receive authorization to transmit their requested transmission over the shared-media network. Those of ordinary skill in the art will recognize that it is possible to introduce additional multiplexing at the terminal equipment 210.

An advantage of the method in this regard is that it extends the prior teachings of Demers et al., in that there is no need to keep an explicit list of requests 405 from (or on behalf of) a given terminal equipment 210, but only of the total number of requests 405 for each terminal equipment's transmission queue(s) and the virtual scheduling times associated with the first request 405 in each queue. See Keshav, "On the Efficient Implementation of Fair Queuing", Internetworking, Research and Experience, Vol. 2, No. 3, September 1991, pp. 157–173.

[10] New entries can of course be added to the transmission scheduling list at the appropriate points to maintain the sorted order of the list. Alternatively, new entries can be appended or prepended and the list then resorted. In general, sorting of the entries in a transmission scheduling list is first performed lexiographically via the quality of service indicator and, secondarily, by virtual scheduling times. For an illustrative list of quality of service designations see this document's Background section.

[11] The authorization signal 410 is issued by the head-end controller 105 to either a single (identified) terminal equipment 210 or a group of terminal equipments. Specifically, an authorization signal 410 permits the receiving terminal equipment 210 to use the upstream transmission resource during a specific time period. If the authorization signal 410 is sent to a single terminal equipment 210, it is referred to as a "directed grant." When an authorization signal 410 is transmitted to a plurality of terminal equipments 210, it is referred to as a "contention grant."

4.3. Virtual Scheduling Time

In one embodiment, the virtual scheduling time is generated by a rate-based queuing process such as weighted fair queuing, or approximations to fair queuing thereto such as round-robin. Schemes such as round-robin approximate ordering by time stamps by servicing flows in round-robin order. The round-robin order deviates from the order provided by the virtual scheduling time but the deviation is bounded.

In general, fair queuing and related algorithms operate on packet sequences (an ATM cell is a packet for the purposes of this discussion). For ATM these sequences are identified by either the virtual circuit identifier (VCI) or the virtual path identifier (VPI), while in the Internet protocol suite the identification is on the basis of IP address, protocol, and port number or flow identifiers (see the definition of flow identifier in this document's Background section). In both self-clocked weighted fair queuing and virtual clock queuing methodologies, packets are ordered (sorted) by time-stamps (schemes such as round-robin provide approximations to ordering of packets by time-stamps). These time-stamps represent the virtual finishing time for the packet and are computed by taking a starting time value and adding an offset obtained by multiplying the length of the packet by a weight which represents the particular packet sequence's share of the bandwidth.

For virtual clock the virtual finishing time is computed as:

$$VT(f,0)=0$$

$$VT(f,j+1)=\text{MAX}\{\text{Arrival}(f,j+1), VT(f,j)\}+\text{Length}(f,j+1) \div \text{Rate}(f),$$

where $VT(f,j)$ is the virtual finishing time associated with packet j of flow (virtual circuit) f; $\text{Arrival}(f,j)$ is the arrival time of packet j of flow f; $\text{Length}(f,j)$ is the length (e.g., bytes orbits) of packet j of flow f; $\text{Rate}(f)$ is the transfer rate allocated/established for flow f and does not vary from packet to packet; and the MAX operator selects the larger of its constituent parameters.

Self-clocked weighted fair queuing methodologies, on the other hand, assign virtual finishing times according to the formula:

$$VT(f,0)=0$$

$$VT(f,j+1)=\text{MAX}\{\text{System VirtualTime}, VT(f,j)\}+\text{Length}(f,j+1) \times \text{Weight}(f),$$

where System VirtualTime is defined as the virtual time associated with the packet being served (i.e., being output) at the time packet(f,j+1) arrives, and Weight(f) is the fraction of the channel's total bandwidth allocated to flow f.

For ATM systems the packet length is constant because the cells are of fixed size and thus the rightmost term in both of the above expressions becomes a per-flow constant. For instance, in a virtual clock queuing system using ATM the simplified expression is:

$$VT(f,j+1)=\text{MAX}\{\text{Arrival}(f,j+1), VT(f,j)\}+\text{constant}(f).$$

As a result, an ATM queuing point (e.g., head-end controller) which implements either virtual clock or self-clocked weighted fair queuing performs the following steps: (1) compute the maximum of the current virtual time for the virtual circuit and either of (i) the arrival time of the request for bandwidth or (ii) the system virtual time; (2) add to the results of step-1 a per-virtual circuit constant representing that circuit's share of the total available upstream bandwidth; and (3) sending transmission authorization signals to the relevant terminal equipment in order of increasing values of the virtual time stamps assigned by steps 1 and 2.

4.4. Additional Implementation Notes

In the above described scheme for allocating communication bandwidth, the possibility exists that a terminal equipment 210 could request bandwidth but not fill the slots allocated it by the head-end controller 105. There are two straightforward means of solving this problem. First, the terminal equipment 210 (that is to say, the user of the terminal equipment) could be charged for any bandwidth it requested and was allocated but went unused. Secondly, the head-end controller 105 could clear any outstanding requests 405 by a terminal equipment 210 that did not use the allocated bandwidth. The first method makes it expensive to request but not use bandwidth. The second method would tend to force a terminal equipment 210 to re-request bandwidth if it does not fill n consecutive slots (where n is a parameter defined by a service provider, probably around 2). A combination of the two approaches may be desirable.

4.5. A More General Embodiment

A more general implementation of the preceding specific embodiment includes the use of a bandwidth allocation unit 305 in place of the head-end controller 105. Here, the term "bandwidth allocation unit" is intended to be a generic descriptor for any controller whose functions include the management of communication bandwidth over the links connected to it. In a standard cable television hybrid fiber-coax network such as that shown in FIG. 1, the bandwidth allocation unit 305 is a superset of the head-end controller 105.

4.6. Program Storage Device

As noted above, the bandwidth allocation unit may be implemented in part by programming a general-purpose processor. One such implementation may be achieved by reprogramming an existing bandwidth allocation unit having such a processor. The programming may be accomplished through the use of a program storage device readable by the processor that encodes a program of instructions executable by the processor for performing the operations described above. The program storage device may take the form of, e.g., read-only memory (ROM) installed on a circuit board containing the processor, as well as other forms of the kind well-known in the art or subsequently developed. The program of instructions may be "object code," i.e., in binary form that is executable more-or-less directly by the computer; in "source code" that requires compilation or interpretation before execution; or in some intermediate form such as partially compiled code. The precise forms of the program storage device and of the encoding of instructions are immaterial here.

Those of ordinary skill in the art will recognize that this invention provides a method and mechanism for computing the allocation of bandwidth resources required by systems such as described in U.S. Pat. No. 5,425,027, "Wide Area Fiber and TV Cable Fast Packet Cell Network," such that the allocation of such bandwidth resources provides provable hard real-time guarantees and provably (in the control-theoretic sense) stable and robust (a misbehaving user cannot destroy the service given to a correctly behaving service) service for elastic classes, e.g., ABR or best effort. See the citations above; see also S. Shenker, "A Theoretical Analysis of Feedback Flow Control," Proceedings of SIG-COMM '90, 1990, and S. Keshav, "A Control Theoretic Approach to Feedback Flow and Control," Computer Communications Review, Vol 21:4, September 1991. These properties are not necessarily present in shared media where the requests are serviced either in random order or in an order which is equivalent to FIFO.

It will be appreciated by those of ordinary skill having the benefit of this disclosure that numerous variations from the foregoing illustration will be possible without departing from the inventive concept described herein. Accordingly, it is the claims set forth below, and not merely the foregoing illustration, which are intended to define the exclusive rights claimed in this application program.

What is claimed is:

1. A method for selectively authorizing transmission of packet-based communications signals in a hybrid fiber-coax network, said hybrid fiber-coax network having a bandwidth allocation unit and a plurality of terminal equipment units, wherein each one of said plurality of terminal equipment units are operatively coupled to a head-end controller co-located with the bandwidth allocation unit, the method, executed by the bandwidth allocation unit, comprising:

(a) receiving a transmission authorization request signal from an identified terminal equipment, said transmission authorization request signal being associated with a requested transmission;

(b) generating a virtual scheduling time for the requested transmission, based on (1) the time of arrival of said transmission authorization request signal, (2) a class of service associated with the requested transmission, and (3) a virtual scheduling time of a previous transmission authorization request made on behalf of the identified terminal equipment;

(c) adding to a transmission scheduling list an entry corresponding to the requested transmission, said entry encoding a value derived from said virtual scheduling time;

(d) sorting the transmission scheduling list in accordance with a lexicographic sort; and (e) sending a transmission authorization signal to the identified terminal equipment in accordance with the position of said virtual scheduling time in the sorted transmission scheduling list.

2. The method of claim 1, wherein:

(i) each entry in the transmission scheduling list has a class-of-service indicator; and (ii) said entries in the transmission scheduling list are sorted first by class of service indicators and second by virtual scheduling times.

3. The method of claim 1, wherein the transmission authorization request signal is generated by the head-end controller as a result of previous negotiation or provisioning.

4. The method of claim 1, wherein said virtual scheduling time is generated by a rate-based queuing process.

5. The method of claim 4, wherein the rate-based queuing process is a weighted fair queuing process.

6. The method of claim 1, wherein said virtual scheduling time is associated with a reserve traffic class and is generated by a virtual clock algorithm.

7. The method of claim 2, wherein:

(i) said transmission authorization request signal is one of a series of transmission authorization request signals generated by the identified terminal equipment for authorization to transmit packets of a fixed size;

(ii) said head-end controller maintains a representation of a queue for each traffic class for said terminal equipment in the form of a counter of the aggregate number of requests received but not yet granted for the identified terminal equipment; and (iii) only one virtual scheduling time per terminal equipment is kept in said transmission scheduling list.

8. A method of selectively authorizing transmission of packet-based communications signals on a shared-media packet based network, said packet based network having a centralized bandwidth allocation unit and a network access unit wherein said network access unit is operatively coupled to said bandwidth allocation unit, the method, executed by the bandwidth allocation unit, comprising:

(a) receiving a transmission authorization request signal from the network access unit, said transmission authorization request signal being associated with a requested transmission;

(b) generating a virtual scheduling time for the requested transmission based on (1) a time of arrival for said transmission authorization request signal, (2) a class of service associated with said requested transmission, and (3) a virtual scheduling time of a previous transmission authorization request made by or on behalf of the network access unit;

(c) adding to a transmission scheduling list an entry corresponding to said transmission authorization request signal, said entry encoding a value derived from said virtual scheduling time;

(d) sorting said transmission scheduling list in accordance with a lexicographic sort; and (e) transmitting a transmission authorization signal to the network access unit in accordance with the position of said virtual scheduling time in the transmission scheduling list.

9. The method of claim 8, wherein:

(i) each entry in the transmission scheduling list has a class-of-service indicator; and (ii) said entries in the transmission scheduling list are sorted first by class of service indicators and second by virtual scheduling times.

10. The method of claim 8, wherein the transmission authorization request signal is generated by the bandwidth allocation unit as a result of previous negotiation or provisioning.

11. The method of claim 8, wherein said virtual scheduling time is generated by a rate-based queuing process.

12. The method of claim 11, wherein said rate-based queuing process is a weighted fair queuing process.

13. The method of claim 12, wherein said virtual scheduling time is associated with a reserve traffic class and is generated by a virtual clock algorithm.

14. The method of claim 11, wherein (i) said transmission authorization request signal is one of a plurality of transmission authorization request signals generated by the network access unit for authorization to transmit packets of a fixed size;

(ii) said bandwidth allocation unit maintains a representation of a queue for each traffic class of the network access unit in the form of a counter of the aggregate number of requests received but not yet granted for said network access unit; and (iii) only one virtual scheduling time per network access unit is kept in said transmission scheduling list.

15. A method for selectively authorizing transmission of packet-based communications signals in a shared-media packet based network, said shared-media packet based network having a centralized bandwidth allocation unit and a plurality of network access units wherein each of said plurality of network access units are operatively coupled to the bandwidth allocation unit, the method, executed by the bandwidth allocation unit, comprising:

(a) receiving a transmission authorization request signal, said transmission authorization request signal being associated with a requested transmission;

(b) adding to a transmission scheduling list an entry corresponding to said requested transmission;

(c) transmitting a transmission authorization signal to one of said plurality of network access units in accordance with a round-robin scheduling of entries in said transmission scheduling list;

(d) wherein:
  (i) the transmission authorization request signal is one of a plurality of transmission authorization request signals generated by a specified network access unit for authorization to transmit packets of a fixed size;
  (ii) the bandwidth allocation unit maintains a representation of a queue for each traffic class of each of said plurality of network access units in the form of a counter of the aggregate number of requests received but not yet granted for each network access unit; and
  (iii) only one virtual scheduling time per network access unit is kept in said transmission scheduling list.

16. The method of claim 15, wherein the transmission authorization request signal is generated by the bandwidth allocation unit as a result of previous negotiation between the bandwidth allocation unit and said one of said plurality of network access units.

17. A method for selectively authorizing transmission of packet-based communications signals in a cable television network, said network having a bandwidth allocation unit and a plurality of cable modems, wherein each one of said plurality of cable modems is operatively coupled to a head-end controller co-located with the bandwidth allocation unit, the method, executed by the bandwidth allocation unit, comprising:

(a) receiving a transmission authorization request signal from an identified cable modem, said transmission authorization request signal being associated with a requested transmission;

(b) using a weighted fair queuing algorithm to generate a virtual scheduling time for the requested transmission, based on (1) the time of arrival of said transmission authorization request signal, (2) a class of service associated with the requested transmission, and (3) a virtual scheduling time of a previous transmission authorization request made on behalf of the identified cable modem;

(c) adding to a transmission scheduling list an entry corresponding to the requested transmission, said entry encoding a value derived from said virtual scheduling time;

(d) sorting the transmission scheduling list in accordance with a lexicographic sort; and (e) sending a transmission authorization signal to the identified cable modem in accordance with the position of said virtual scheduling time in the sorted transmission scheduling list.

18. A method for selectively authorizing transmission of packet-based communications signals in a cable television network, said network having a bandwidth allocation unit and a plurality of set-top boxes, wherein each one of said plurality of set-top boxes is operatively coupled to a head-end controller co-located with the bandwidth allocation unit, the method, executed by the bandwidth allocation unit, comprising:

(a) receiving a transmission authorization request signal from an identified set-top box, said transmission authorization request signal being associated with a requested transmission;

(b) using a weighted fair queuing algorithm to generate a virtual scheduling time for the requested transmission, based on (1) the time of arrival of said transmission authorization request signal, (2) a class of service associated with the requested transmission, and (3) a virtual scheduling time of a previous transmission authorization request made on behalf of the identified set-top box;

(c) adding to a transmission scheduling list an entry corresponding to the requested transmission, said entry encoding a value derived from said virtual scheduling time;

(d) sorting the transmission scheduling list in accordance with a lexicographic sort; and (e) sending a transmission authorization signal to the identified set-top box in accordance with the position of said virtual scheduling time in the sorted transmission scheduling list.

19. A bandwidth allocation unit comprising (a) a processor and (b) a program storage device that is readable by the processor and that encodes a program of instructions for performing a method in accordance with any of claims 1 through 18.

20. A program storage device encoding a machine-readable copy of a program of instructions, said program of instructions being executable by a bandwidth allocation unit for performing a method in accordance with any of claims 1 through 18.

* * * * *